United States Patent
Morrow

(10) Patent No.: US 7,596,683 B2
(45) Date of Patent: Sep. 29, 2009

(54) SWITCHING PROCESSOR THREADS DURING LONG LATENCIES

(75) Inventor: Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 11/827,207

(22) Filed: Jul. 11, 2007

(65) Prior Publication Data

US 2007/0260853 A1 Nov. 8, 2007

Related U.S. Application Data

(62) Division of application No. 10/661,079, filed on Sep. 12, 2003, now abandoned.

(51) Int. Cl.
G06F 9/44 (2006.01)

(52) U.S. Cl. ......................... 712/228; 712/43

(58) Field of Classification Search ............ 712/43, 712/228
See application file for complete search history.

(56) References Cited

U.S. PATENT DOCUMENTS

| | | | | |
|---|---|---|---|---|
| 5,357,617 A * | 10/1994 | Davis et al. | .................. | 712/245 |
| 5,870,588 A | 2/1999 | Rompaey et al. | ............... | 703/13 |
| 5,872,985 A * | 2/1999 | Kimura | .......................... | 710/1 |
| 6,016,542 A | 1/2000 | Gottlieb et al. | ............. | 712/225 |
| 6,049,867 A | 4/2000 | Eickemeyer et al. | ........ | 712/228 |
| 6,076,157 A | 6/2000 | Borkenhagen et al. | ...... | 712/228 |
| 6,295,600 B1 * | 9/2001 | Parady | ........................ | 712/228 |
| 6,463,522 B1 | 10/2002 | Akkary | ........................ | 712/216 |
| 6,662,297 B1 * | 12/2003 | Boom et al. | ................. | 712/245 |
| 6,697,935 B1 | 2/2004 | Borkenhagen et al. | ...... | 712/228 |
| 6,775,740 B1 | 8/2004 | Nishiyama | .................. | 711/118 |
| 7,000,233 B2 * | 2/2006 | Levitan et al. | .............. | 718/107 |
| 7,165,254 B2 * | 1/2007 | Yoshida | ....................... | 718/102 |
| 2003/0004683 A1 * | 1/2003 | Nemawarkar | ............... | 702/186 |
| 2003/0018826 A1 | 1/2003 | Chaudhry et al. | ........... | 709/310 |
| 2004/0073735 A1 * | 4/2004 | Boom et al. | ................. | 710/260 |
| 2004/0210742 A1 * | 10/2004 | Levitan et al. | .............. | 712/218 |
| 2005/0005088 A1 * | 1/2005 | Yearsley et al. | ............. | 712/235 |
| 2005/0097552 A1 | 5/2005 | O'Conner et al. | ........... | 718/100 |

OTHER PUBLICATIONS

Kreuzinger et al., "Context-switching techniques for decoupled multithreaded processors", Euromicro Conference, 1999, Proceedings, 25th. IEEE © 1999. pp. 248-251.*

Bondalapati, Kiran. "Parallelizing DSP Nested Loops on Reconfigurable Architecture using Data Context Switching". DAC 2001. ACM © 2001. pp. 273-276.*

(Continued)

*Primary Examiner*—Aimee J Li
(74) *Attorney, Agent, or Firm*—Trop, Pruner & Hu, P.C.

(57) ABSTRACT

In one embodiment, the present invention includes an apparatus to determine whether execution of an instruction of a first thread may require a long latency and switch to a second thread if the instruction may require the long latency. In certain embodiments, at least one additional instruction may be executed in the first thread while preparing to switch threads.

14 Claims, 3 Drawing Sheets

OTHER PUBLICATIONS

Marr, Deborah T. ,et al. "Hyper-Threading Technology Architecture and Microarchitecture" http://developer.intel.com/sites/corporate/tradmarx.htm. Intel Corporation, Feb. 2002.

"Introduction to Hyper-Threading Technology" http://www.intel.com/technology/hyperthread/download/25000802.pdf. Intel Corporation, 2001.

"Intel® XScale™ Microarchitecture for the PXA255 Processor-Users Manual" Table of Contents, and Appendix A. http://www.intel.com/design/pca/applicationsprocessors/manuals/27879601.pdf. Intel Corporation, Mar. 2003.

* cited by examiner

SWITCHING PROCESSOR THREADS DURING LONG LATENCIES

This application is a division of U.S. patent application Ser. No. 10/661,079 filed Sep. 12, 2003 now abandoned entitled "SWTICHING PROCESSOR THREADS DURING LONG LATENCIES," the content of which is hereby incorporated by reference.

BACKGROUND

Processors, such as modern high-performance processors, are designed to execute a large number of instructions per clock cycle. Certain instructions produce a result only after a potentially large number of cycles. Such instructions may be known as "long latency" instructions, as a long time interval exists between the time an instruction is delivered and when it is executed. A long latency may occur, for example, when data required by an instruction needs to be loaded from a high level of memory. Such a load operation therefore may have a "load-use" penalty associated with it. That is, after a program issues such a load instruction, the data may not be available for multiple cycles, even if the data exists (i.e., "hits") in a cache memory associated with the processor.

Processors typically allow execution to continue while a long latency instruction is outstanding. Often, however, data is needed relatively soon (e.g., within several clock cycles) because insufficient work remains to be done by the processor without the requested data. Accordingly, a need exists to improve processor performance in such situations.

DETAILED DESCRIPTION

Figure 1:
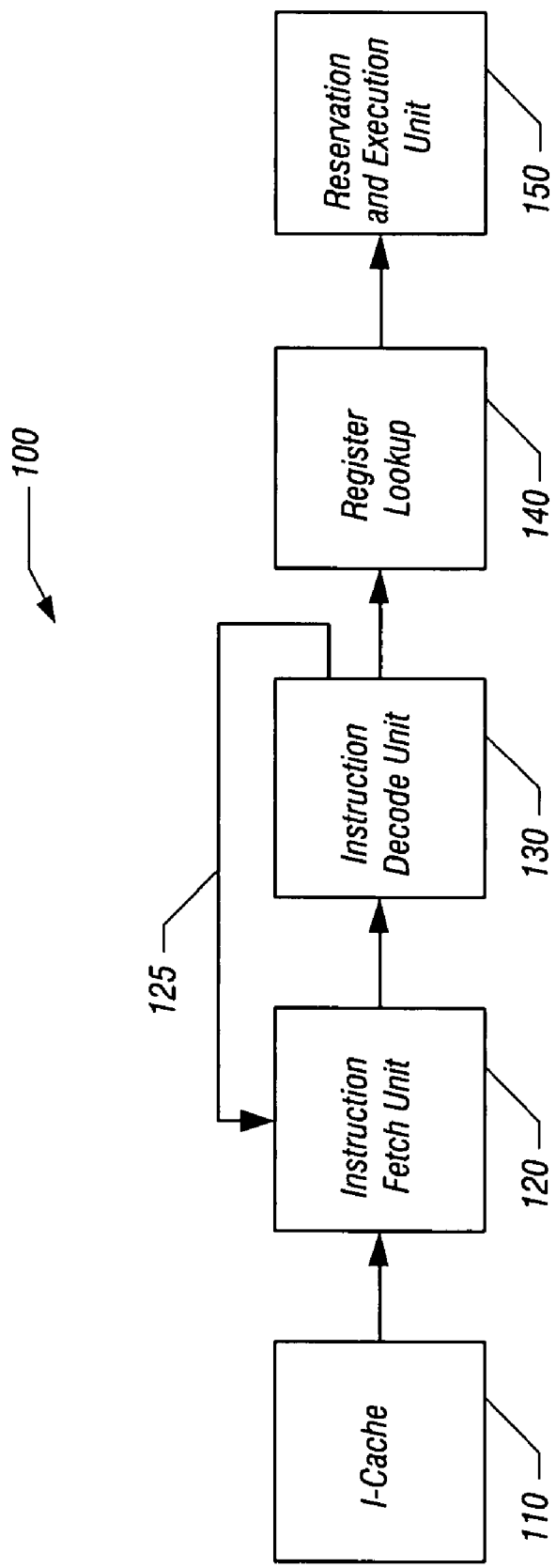
FIG. 1 is a block diagram of a portion of a processor pipeline in accordance with one embodiment of the present invention.

Referring to FIG. 1, shown is a block diagram of a portion of a processor pipeline in accordance with one embodiment of the present invention. As shown in FIG. 1, pipeline 100 includes an instruction cache (I-cache) 110, an instruction fetch unit 120, an instruction decode unit 130, a register lookup 140, and reservation and execution unit 150, although the scope of the present invention is not limited in this regard.

While the type of processor which includes a pipeline in accordance with an embodiment of the present invention may vary, in one embodiment the processor may be a relatively simple in-order processor. In one embodiment, the processor may have a reduced instruction set computing (RISC) architecture, such as an architecture based on an Advanced RISC Machines (ARM) architecture. For example, in one embodiment a 32-bit version of an INTEL® XSCALE™ processor available from Intel Corporation, Santa Clara, Calif. may be used. However, in other embodiments the processor may be a different processor.

In one embodiment, I-cache 110 may be coupled to receive instructions from a bus interface unit of the processor. I-cache 110 may be used to store instructions, including instructions of multiple threads of a program. I-cache 110 may be coupled to provide instructions to instruction fetch unit 120. Alternately, instruction fetch unit 120 may receive instructions from a fill buffer (which may be within reservation and execution unit 150). Instruction fetch unit 120 may include, in certain embodiments, program counters for each thread to be executed on the processor, along with logic to sequence between the threads. In an embodiment in which out-of-order processing is implemented, instruction fetch unit 120 may include a branch target buffer that may be used to examine instructions fetched from I-cache 110 to determine whether any branching conditions exist.

As shown in FIG. 1, instruction decode unit 130 is coupled to receive fetched instructions from instruction fetch unit 120. Instruction decode unit 130 may be used to decode instructions by breaking more complex instructions into smaller instructions that may be processed faster. For example, in one embodiment instructions may be decoded into micro-operations (uops). However, in other embodiments other types of instructions may be decoded, such as macro operations or another form of instruction. Additionally, it is to be understood that various instruction sets may be used, such as Reduced Instruction Set Computing (RISC) instructions or Complex Instruction Set Computing (CISC) instructions. Further, in one embodiment instruction decode unit 130 may decode CISC instructions to RISC instructions.

Still referring to FIG. 1, decoded instructions, including an identification of registers to be accessed, may be provided to register lookup 140. Register lookup 140 may be used to provide a physical register identification of a register in a register file unit. In such manner, registers may be assigned to each instruction. Also, register lookup 140 may, in certain embodiments, be used to stall the pipeline if register dependencies exist. Stalls are cycles in which the processor pipeline does not execute an instruction.

From register lookup 140, instructions may then proceed to reservation and execution unit 150 for scheduling execution of the instructions in the execution unit (or units) of the processor (e.g., an integer and/or floating point arithmetic logic unit (ALU)). In one embodiment, multiple execution units may be present. Such execution units may include a main execution pipeline, a memory pipeline and a multiply-accumulate (MAC) pipeline. In such an embodiment, the main execution pipeline may perform arithmetic and logic operations, as required for data processing instructions and load/store index calculations, and may further determine conditional instruction execution. The memory pipeline may include a data cache unit to handle load and store instructions. The MAC pipeline may be used to perform multiply and multiply-accumulate instructions.

The above-described flow through pipeline 100 may describe normal operational flow. Such flow may occur when instructions do not require long latencies prior to execution, or in the absence of other conditions that may lead to processor stalls.

However in accordance with various embodiments of the present invention, when certain predetermined events or conditions occur, such as an instruction that may require a long latency prior to execution, a feedback loop 125 from instruction decode unit 130 to instruction fetch unit 120 may be activated to cause instruction fetch unit 120 to prepare to switch threads and accordingly fetch instructions for the new thread.

In one embodiment, identifications of predetermined conditions may be stored in instruction decode unit 130, although the scope of the present invention is not limited in this regard. For example, the identifications may be stored in a lookup table or other storage within instruction decode unit 130. In this manner, when an instruction is received by instruction decode unit 130, it may be analyzed against entries in the lookup table to determine whether the instruction corresponds to one of the predetermined conditions. If so, a feedback signal on feedback loop 125 may be activated. Alternately, logic in instruction decode unit 130 may be used to detect for the presence or occurrence of a predetermined condition. In still other embodiments, microcode in instruction decode unit 130 may determine the presence or occurrence of a predetermined condition.

While the predetermined conditions may vary in different embodiments, an instruction that may require a long latency prior to execution may be considered to be a predetermined condition. As used herein, the term "long latency" means a time period between receipt of an instruction and execution of the instruction that causes the processor to suffer one or more stalls. Thus a long latency period may be several cycles or may be hundreds of cycles, depending on the ability of the processor to perform other instructions in the latency period. For example, a load instruction that requires the obtaining of information from system memory (e.g., as on a cache miss) may require hundreds of cycles, while a load instruction that obtains data from a cache (such as a level 1 (L1) cache) closely associated with the processor may require fewer than ten cycles. In certain embodiments, both load instructions may be considered long latency instructions, as a processor may suffer stall cycles before data is ready for processing.

Thus a load instruction is an example instruction that may cause a long latency and thus may be considered a predetermined condition. While the latency caused by a load instruction may vary depending on the level of memory at which the data is obtained, the presence of a load instruction itself, regardless of actual latency, may be sufficient to cause a feedback signal in accordance with an embodiment of the present invention. In other words, a feedback signal in accordance with an embodiment of the present invention may be based on stochastic models. That is, the predetermined conditions may be selected based on a knowledge that the conditions may, but need not necessarily, cause a latency that leads to pipeline stalls.

Other examples of instructions that may be considered to be a predetermined condition may include store instructions and certain arithmetic instructions. For example, a floating point divide operation may be a condition that causes a feedback signal. In addition, other operations which require accessing a memory subsystem may be a condition causing a feedback signal to be initiated.

When a predetermined condition is detected, instructions of another thread may be fetched and executed so that few or no stall cycles occur. Thus in certain embodiments, performance may be significantly increased in multi-thread contexts. At the same time, no performance difference occurs in a single thread context, because during single thread operation, instructions pass directly through pipeline 100, as discussed above.

Figure 2:
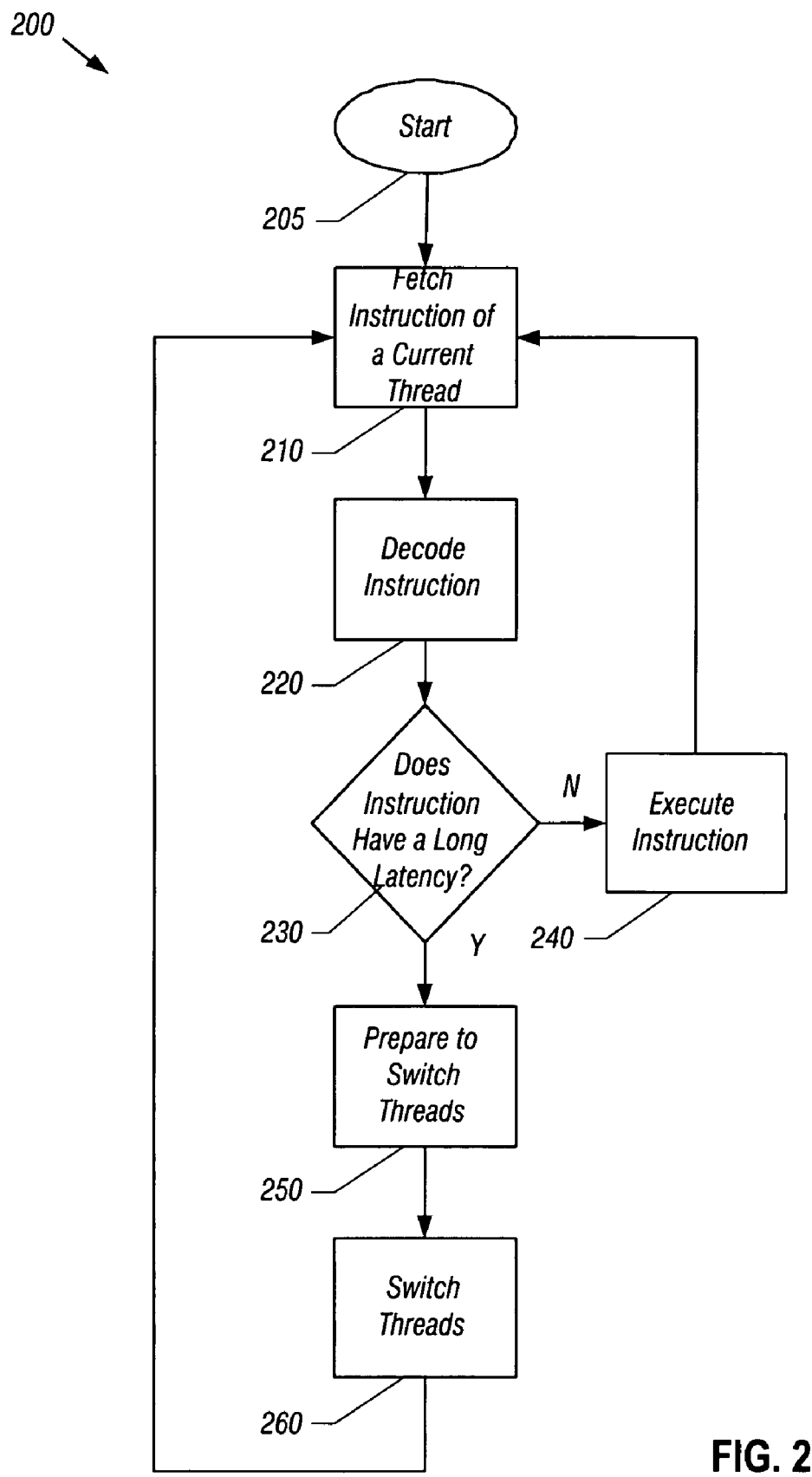
FIG. 2 is a flow diagram of a method in accordance with one embodiment of the present invention.

Referring now to FIG. 2, shown is a flow diagram of a method in accordance with one embodiment of the present invention. While FIG. 2 relates specifically to a method for processing a long latency instruction, it is to be appreciated that the flow of FIG. 2 may be applicable to any predetermined condition. As shown in FIG. 2, method 200 may start (oval 205) and fetch an instruction of a current thread (block 210). Next, the instruction may be decoded (block 220). After decoding, it may be determined whether a predetermined condition has been met. For example, it may be determined whether the instruction is one of the predetermined conditions, for example, because it may cause a long latency (diamond 230). Such a determination may be made in instruction decode unit 130, in one embodiment.

If it is determined that the instruction may not have a long latency (i.e., a predetermined condition has not occurred), the instruction may be executed (block 240) and a next instruction of the current thread may be fetched (block 210).

If instead it is determined that a long latency may result (i.e., a predetermined condition has occurred), the pipeline may be prepared to switch threads (block 250). In one embodiment, preparation to switch threads may include executing a remaining one or several instructions of the first thread prior to the thread switch. In such manner, additional instructions may be performed without a processor stall. More so, because such instructions are already present in the processor pipeline, they need not be flushed. Thus instructions of a first thread may continue to be processed while the second thread is prepared for execution. For example, an embodiment executed in the processor pipeline 100 of FIG. 1 may have a two pipeline-stage delay caused by the feedback signal on feedback loop 125. This delay may thus allow two additional instructions of the first thread to be performed before the second thread begins execution.

Preparing to switch threads may further include setting instruction fetch unit 120 to fetch an instruction of the new thread. For example, a program counter for the second thread within instruction fetch unit 120 may be selected and used to fetch the next instruction of the thread.

Next, the threads may be switched (block 260). In the embodiment of FIG. 2, such thread switching may cause instruction fetch unit 120 to obtain an instruction of the new thread from I-cache 110 (block 210). Additionally, various control registers and other information corresponding to the new thread may be loaded into different registers and portions of the processor pipeline to allow execution of instructions of the new thread.

Referring now to Table 1, shown is an example of execution of a code portion in accordance with an embodiment of the present invention:

TABLE 1

Thread0:
    ADD R2
        LDR to R0
        SUB R3
        XOR R4
Thread1:
        MUL R3
        LDR to R7
        ADD R1
        AND R4
Thread0:
        ADD R0
        . . .

As shown in Table 1, a first thread (Thread 0) may be executing in a processor pipeline. When a long latency instruction is detected by instruction decode unit 130 (i.e., the Load to register 0 (LDR to R0) instruction), a signal may be sent on feedback line 125 to instruction fetch unit 120 to prepare for a new thread. At the same time, one or more additional instructions of the first thread may be executed in the processor pipeline (e.g., SUB R3 and XOR R4).

Then as shown in Table 1, a second thread (i.e., Thread 1) may be switched to and begun activation. As with the first thread, the second thread may begin executing instructions and continue until a long latency instruction is encountered (i.e., the Load to register 7 (LDR to R7) instruction). As above, at the detection of a long latency instruction, preparation may be made to switch threads again, while at the same time processing one or more additional instructions of the current thread.

Finally as shown in Table 1, the original thread (i.e., Thread 0) may again be switched to and begun execution. While shown and discussed in Table 1 as having two threads of operation, it is to be understood that in other embodiments multithread operations may encompass more than two threads.

Embodiments of the present invention may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions, including programmable storage devices.

Figure 3:
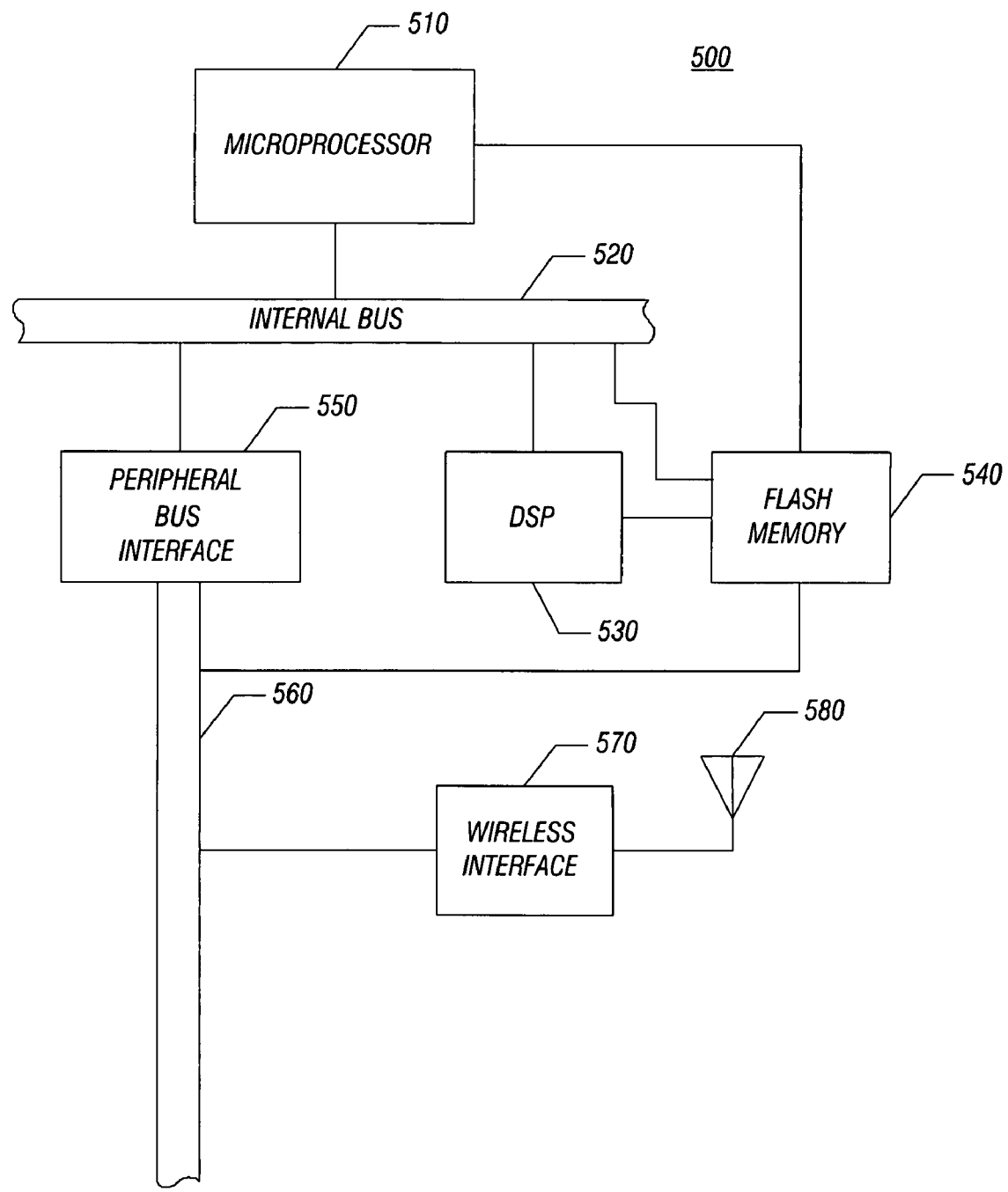
FIG. 3 is a block diagram of a wireless device in accordance with one embodiment of the present invention.

FIG. 3 is a block diagram of a wireless device with which embodiments of the invention may be used. As shown in FIG. 3, in one embodiment wireless device 500 includes a processor 510, which may include a general-purpose or special-purpose processor such as a microprocessor, microcontroller, application specific integrated circuit (ASIC), a programmable gate array (PGA), and the like. Processor 510 may include a feedback loop in accordance with one embodiment of the present invention and may be programmed to switch threads when a predetermined condition occurs. Processor 510 may be coupled to a digital signal processor (DSP) 530 via an internal bus 520. In turn, DSP 530 may be coupled to a flash memory 540. As further shown in FIG. 3, flash memory 540 may also be coupled to microprocessor 510, internal bus 520, and peripheral bus 560.

As shown in FIG. 3, microprocessor 510 may also be coupled to a peripheral bus interface 550 and a peripheral bus 560. While many devices may be coupled to peripheral bus 560, shown in FIG. 3 is a wireless interface 570 which is in turn coupled to an antenna 580. In various embodiments antenna 580 may be a dipole antenna, helical antenna, global system for mobile communication (GSM) or another such antenna.

Although the description makes reference to specific components of device 500, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a processor including a processor pipeline having a plurality of pipeline stages to receive and execute instructions, the processor pipeline having a feedback loop coupled between a first pipeline stage and a second pipeline stage to provide a feedback signal generated in the second pipeline stage back to the first pipeline stage to cause the processor pipeline to switch from a first thread to a second thread, the feedback signal to originate from a location in the processor pipeline before instruction execution and having a two-pipeline stage delay from generation in the second pipeline stage to receipt in the first pipeline stage, wherein the feedback signal is coupled between an instruction decoder and an instruction fetch unit, and the processor pipeline is to execute one or more instructions of the first thread while preparing to switch to the second thread without a processor stall and store results of the one or more instructions in a destination storage.

2. The apparatus of claim 1, wherein the instruction decoder is coupled to provide the feedback signal to the instruction fetch unit, when a predetermined condition occurs.

3. The apparatus of claim 2, wherein the instruction decoder includes logic to determine when the predetermined condition occurs.

4. The apparatus of claim 2, wherein the instruction decoder includes a lookup table to store a list of predetermined conditions to which an instruction is compared an to generate the feedback signal when the instruction hits in the lookup table.

5. The apparatus of claim 1, further comprising at least one storage device to store code to enable the processor pipeline to switch from the first thread to the second thread in a predetermined condition occurs during execution of the first thread.

6. The apparatus of claim 5, wherein the at least one storage device includes code to enable the processor pipeline to execute the one or more instructions of the first thread while preparing to switch to the second thread.

7. The apparatus of claim 1, further comprising wireless interface including a dipole antenna.

8. An apparatus comprising:
 an instruction fetch unit to receive instructions from an instruction cache;
 an instruction decoder coupled to receive the instructions from the instruction fetch unit; and
 a feedback loop coupled between the instruction decoder and the instruction fetch unit to provide a feedback signal generated in the instruction decoder back to the instruction fetch unit to cause a switch from a first thread to a second thread, the feedback signal having a two-pipeline stage delay from generation in the instruction decoder to receipt in the instruction fetch unit, wherein the apparatus is to execute one or more instructions of the first thread while preparing to switch to the second thread without a stall and store results of the one or more instructions in a destination storage.

9. The apparatus of claim 8, wherein the instruction decoder is coupled to provide the feedback signal to the instruction fetch unit when a predetermined condition occurs.

10. The apparatus of claim 9, wherein the instruction decoder includes logic to determine when predetermined condition occurs.

11. The apparatus of claim 9, wherein the instruction decoder includes a lookup table to store a list of predetermined conditions to which an instruction is compared and to generate the feedback signal when the instruction hits in the lookup table.

12. The apparatus of claim 8, further comprising at least one storage device to store code enable a processor pipeline to switch from the first thread to the second thread if a predetermined condition occurs during execution of the first thread.

13. The apparatus of claim 12, wherein the at least one storage device includes code to enable the processor pipeline to execute the one or more instructions of the first thread while preparing to switch to the second thread.

14. The apparatus of claim 8, further comprising wireless interface including a dipole antenna.

* * * * *

UNITED STATES PATENT AND TRADEMARK OFFICE
CERTIFICATE OF CORRECTION

Page 1 of 1

PATENT NO. : 7,596,683 B2
APPLICATION NO. : 11/827207
DATED : September 29, 2009
INVENTOR(S) : Michael W. Morrow It is certified that error appears in the above-identified patent and that said Letters Patent is hereby corrected as shown below:

Col. 6:
Line 22, "compared an to" should be --compared and to--;
Line 28, "thread in a" should be --thread if a--;
Line 61, before "predetermined" insert --the--;

Col. 7:
Line 2, "code enable" should be --code to enable--.

Signed and Sealed this
Fifteenth Day of January, 2013

David J. Kappos
*Director of the United States Patent and Trademark Office*